United States Patent [19]
Amin et al.

[11] Patent Number: 6,123,360
[45] Date of Patent: Sep. 26, 2000

[54] AIRBAG SYSTEM WITH INFLATOR GAS REACTANT SURFACE

[76] Inventors: Mukesh J. Amin, 41453 Greenwood Dr., Canton, Mich. 48187; David Webster Clark, 3466 Essex, Troy, Mich. 48084

[21] Appl. No.: 09/348,249

[22] Filed: Jul. 6, 1999

[51] Int. Cl.$^7$ .................................................. B60R 21/20
[52] U.S. Cl. .................................. 280/743.1; 280/730.2; 280/741
[58] Field of Search ................................ 280/743.1, 741, 280/730.2

[56] References Cited

U.S. PATENT DOCUMENTS

| | | |
|---|---|---|
| 5,378,015 | 1/1995 | Rink et al. . |
| 5,529,837 | 6/1996 | Fujiki et al. . |
| 5,584,507 | 12/1996 | Khandhadia et al. . |
| 5,685,562 | 11/1997 | Jordan et al. . |
| 5,700,532 | 12/1997 | Chiou ................................... 280/743.1 |
| 5,768,875 | 6/1998 | Bergen . |
| 5,904,369 | 5/1999 | Swann et al. ......................... 280/743.1 |
| 6,012,738 | 1/2000 | Beiswenger ........................... 280/743.1 |

FOREIGN PATENT DOCUMENTS

| | | |
|---|---|---|
| 2-63949 | 3/1990 | Japan . |
| 4-159159 | 6/1992 | Japan . |
| 4-169355 | 6/1992 | Japan . |
| 2 225 291 | 7/1988 | United Kingdom . |

*Primary Examiner*—Kenneth R. Rice
*Attorney, Agent, or Firm*—David B. Kelley

[57] ABSTRACT

An inflatable restraint system for an automotive vehicle has an inflatable restraint packaged within a module housing in an uninflated state and is operatively connected to an inflator for receiving inflator gas therefrom for movement to an inflated position within the vehicle. The inflatable restraint has a gas reactant substance on an interior surface which is reactive with the inflator gas to prolong inflation of the inflatable restraint in the inflated position at a predetermined pressure.

19 Claims, 1 Drawing Sheet

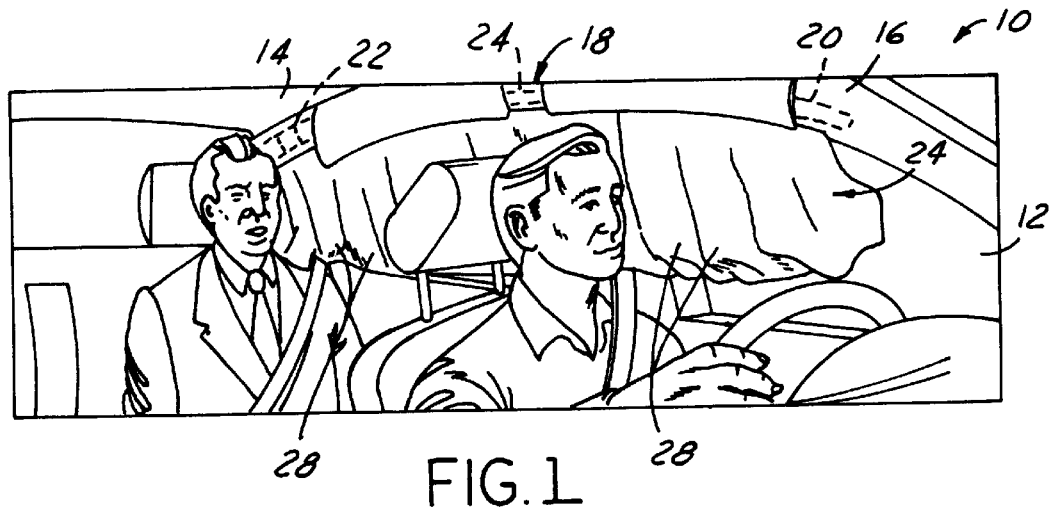
FIG. 1
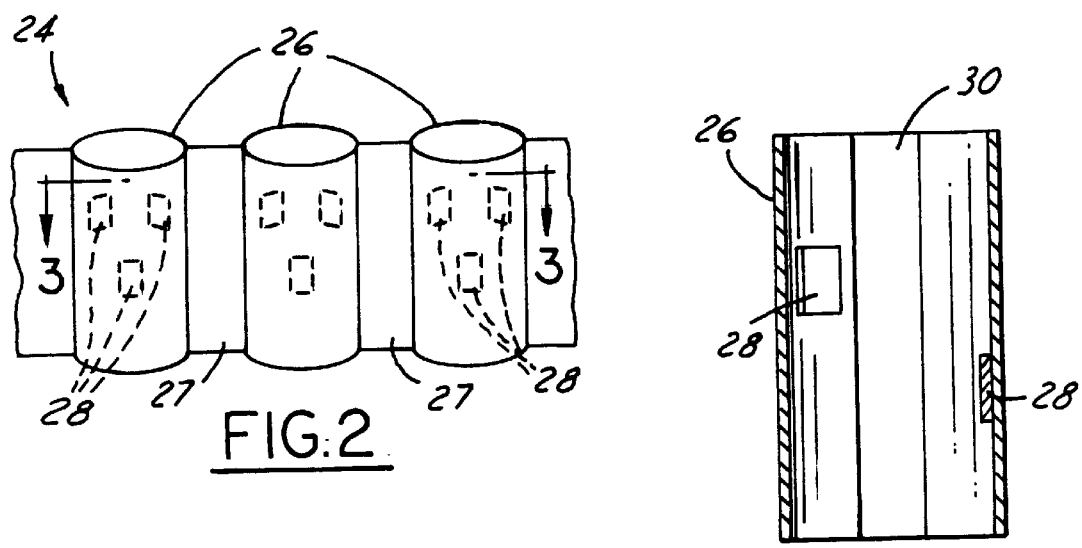
FIG. 2
FIG. 4
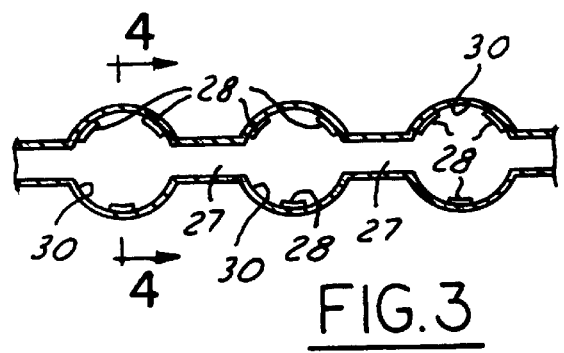
FIG. 3

AIRBAG SYSTEM WITH INFLATOR GAS REACTANT SURFACE

FIELD OF THE INVENTION

The present invention relates generally to automotive vehicle occupant inflatable restraint systems, and more particularly to variable pressure inflatable restraint systems.

BACKGROUND OF THE INVENTION

It is known to provide an inflatable occupant restraint system, commonly called an airbag, to dissipate energy of an occupant in a vehicle experiencing sudden deceleration above a predetermined threshold. At the deceleration threshold, the airbag is inflated by an inflation gas directed into the airbag, which absorbs energy resulting from movement of an occupant against the airbag. At times, it may be desirable to control the pressure within the airbag.

One way to control the pressure within the airbag is to vent the inflation gas through a vent opening, so as to dissipate energy absorbed by contact thereagainst. Various devices for venting an airbag are known, including those shown in U.S. Pat. No. 5,839,755 (Turnbull), and U.S. Pat. No. 4,096,065 (Okada et al.). Systems with such devices, while perhaps satisfactorily providing airbag pressure control through venting upon impact of an occupant, necessarily release inflator gas.

With the proliferation of side inflatable restraint systems, or side airbags, it may be desirable to prolong inflation of the side airbag beyond an initial occupant contact therewith, or for an initial period of time beyond initial inflation. The aforementioned venting devices, while suitable for their purpose, may not allow the desired prolonged airbag inflation.

As such, an airbag system may be desirable which provides prolonged inflation of the inflatable restraint, for example, when the inflator gas has cooled, or during conditions requiring inflation beyond an initial event.

SUMMARY OF THE INVENTION

As a possible alternative responsive to the above-described background, an inflatable restraint system for an automotive vehicle is provided having an inflatable restraint movable between an uninflated state and an inflated position within the vehicle, and having a gas reactant substance on an interior surface of the inflatable restraint. The gas reactant substance is reactive with the inflator gas to prolong inflation of the inflatable restraint in the inflated position at a predetermined pressure level.

An advantage of the present invention is an inflatable restraint system providing prolonged system inflation beyond an initial inflation event.

BRIEF DESCRIPTION OF THE DRAWINGS

These and other objects, advantages, and features of the present invention will be apparent to those skilled in the art upon reading the following description with reference to the accompanying drawings, in which:

FIG. 1 is an interior perspective view of a vehicle occupant compartment showing an inflatable side restraint in a deployed, inflated state;

FIG. 2 is a front view of a section of the inflatable restraint of FIG. 1;

FIG. 3 is a cross-sectional view taken along line 3—3 of FIG. 2; and

FIG. 4 is a cross-sectional view taken along line 4—4 of FIG. 3.

DETAILED DESCRIPTION OF THE PREFERRED EMBODIMENT

Turning now to the drawings, and in particular to FIG. 1 thereof, a vehicle passenger compartment, generally indicated at 10, is partially defined by a side window 12, a roof 14, and a roof rail 16 therebetween. The roof rail has associated therewith a side inflatable restraint system, or side airbag 18. The side airbag 18 may be mounted in a known fashion, such as that shown in U.S. Pat. No. 5,540,459 (Daniel), or as shown in patent application, U.S. Ser. No. 09/318,948. The airbag system 18 has a module housing 20 and an inflator 22 for discharging an inflator gas. The inflator 22 may be contained within the housing, or alternatively, may be conveniently stored exterior to the housing (not shown), depending on design considerations, including packaging requirements. An inflatable restraint 24 is stored within the module housing 20 in an uninflated state (in dotted lines in FIG. 1) and is operatively connected to the inflator 22 for receiving inflator gas therefrom for movement to an inflated position within the vehicle, such as along an interior side of the vehicle, as shown in FIG. 1. Such a side airbag, sometimes referred to as a curtain airbag, may be helpful for energy absorption in side impact or rollover conditions.

One such side curtain airbag 18 has a plurality of vertical sections 26 interconnected by conduits 27 (FIG. 1). According to the present invention, a gas reactant substance, shown as patches 28 in FIGS. 2–4, is applied on an interior surface of the inflatable restraint 24, for example, on an interior surface 30 of each of the sections 26. The gas reactant substance 26 or catalyst, is reactive with the inflator gas to prolong inflation of the inflatable restraint system in the inflated position (FIG. 1) at a predetermined pressure level. The inflator gas of the present invention may be, for example, sodium oxide ($Na_2O$). The gas reactant substance, or catalyst, may be magnesium chloride ($MgCl_2$), which will react exothermically with the inflator gas as follows:

$$Na_2O + MgCl_2 > NaCl + MgO + heat$$

Thus, a solid salt residue remains in the inflatable restraint after the reaction and heat is generated to maintain pressure therein at a predetermined level. Other catalysts, or reactants may also be used, as can other inflator gases.

Preferably, the gas reactant substance is applied at preselected areas of the interior surface of the inflatable restraint 24, for example in the patches 26, as shown in FIGS. 2–4. It is believed that such an arrangement, with the patches 26 at predetermined locations and distances therebetween, provides sufficient reactant to adequately prolong inflation of the airbag while additionally lending itself to efficient manufacture. Those skilled in the art will of course understand that the patches 26 may be of any shape and are not limited to those shown in the drawings.

Furthermore, the size of the patches 26 will vary depending upon various factors, including but not limited to the particular gas reactant substance, the thickness of the substance applied in a given patch or area, the inflator gas used, the volume of the airbag, the duration of desired prolongation of airbag inflation, and the external conditions in which inflation is expected to occur. It is possible that in some applications, substantially the entire inner surface of the airbag may be coated with a gas reactant substance, and in other applications, only small, selected areas need be covered with the gas reactant substance. In the latter case, for example, the gas reactant substance may only need be applied at the gas entrance of a particular airbag, while in other circumstances, the gas reactant substance may only need be applied at locations removed from the inflator gas entrance.

In any case, as will be appreciated by those skilled in the art upon reading this disclosure, the inflatable restraint system 18 according to the present invention prolongs airbag inflation at a predetermined pressure level for a predetermined amount of time as the inflator gases begin to cool after an initial inflation event. Thus, in operation, when a vehicle condition for which airbag deployment is appropriate has been sensed, the inflator is caused to expel inflator gas into the inflatable restraint 24, for example, by ignition by a squibb (not shown) by a signal generated from a airbag control module (not shown), or other airbag ignition methods known in the art. As the inflator 22 expels gas into the inflatable restraint 24, the inflatable restraint 24 moves from the uninflated state stored within the module housing 20 to the inflated state, for example, along the side of the vehicle (FIG. 1). As the inflatable restraint 24 is filled with the inflator gas, it reacts exothermically with the gas reactant substance 26 to produce heat so as to maintain a predetermined pressure level within the inflatable restraint 24.

While the present invention has been described and illustrated with respect to a side airbag system, it may likewise be used for other airbag applications, including but not limited to, front driver's side airbags, passenger side airbags, steering wheel mounted airbags, instrument panel mounted airbags, and seat integrated airbags.

Although the preferred embodiment of the present invention has been disclosed, various changes and modifications may be made without departing from the scope of the invention as set forth in the appended claims.

What is claimed is:

1. An inflatable restraint system for an automotive vehicle, comprising:

a module housing;

an inflator for discharging an inflator gas;

an inflatable restraint packaged within the module housing in an uninflated state and operatively connected to the inflator for receiving inflator gas therefrom for movement to an inflated position within the vehicle; and a gas reactant substance on an interior surface of the inflatable restraint reactive with the inflator gas to prolong inflation of the inflatable restraint in the inflated position at a predetermined pressure.

2. The inflatable restraint system of claim 1, wherein the gas reactant substance is applied at preselected areas of the interior surface of the inflatable restraint.

3. The inflatable restraint system of claim 2, wherein the gas reactant substance is applied in patches at preselected areas of the interior surface of the inflatable restraint.

4. The inflatable restraint system of claim 1, wherein the module housing is mounted for deployment for the inflatable restraint along an interior side surface of the vehicle.

5. The inflatable restraint system of claim 1, wherein the inflator gas is sodium oxide ($Na_2O$).

6. The inflatable restraint system of claim 1, wherein the gas reactant substance is magnesium chloride ($MgCl_2$).

7. An inflatable restraint system for an automotive vehicle, comprising:

a module housing;

an inflator for discharging an inflator gas;

an inflatable restraint packaged within the module housing in an uninflated state and operatively connected to the inflator for receiving inflator gas therefrom for movement to an inflated position within the vehicle; and inflation prolongation means on an interior surface of the inflatable restraint for prolonging inflation of the inflatable restraint in the inflated position at a predetermined pressure.

8. The inflatable restraint system as claimed in claim 7, wherein the inflation prolongation means comprises a gas reactant substance reactive with the inflator gas.

9. The inflatable restraint system of claim 7, wherein the inflator gas is sodium oxide ($Na_2O$).

10. The inflatable restraint system of claim 8, wherein the gas reactant substance is magnesium chloride ($MgCl_2$).

11. The inflatable restraint system of claim 8, wherein the gas reactant substance is applied at preselected areas of the interior surface of the inflatable restraint.

12. The inflatable restraint system of claim 8, wherein the gas reactant substance is applied in patches at preselected areas of the interior surface of the inflatable restraint.

13. The inflatable restraint system of claim 8, wherein the module housing is mounted for deployment for the inflatable restraint along an interior side surface of the vehicle.

14. In an automotive vehicle having an inflatable restraint system with a restraint module housing mounted therein, and an inflator for discharging inflator gas, an inflatable restraint, comprising:

an airbag packaged within the module housing in an uninflated state and operatively connected to the inflator for receiving inflator gas therefrom for movement to an inflated position within the vehicle; and a gas reactant substance on an inner surface of the airbag reactive with the inflator gas to prolong inflation of the airbag in the inflated position at a predetermined pressure.

15. The inflatable restraint system of claim 14, wherein the inflator gas is sodium oxide ($Na_2O$).

16. The inflatable restraint system of claim 14, wherein the gas reactant substance is magnesium chloride ($MgCl_2$).

17. The inflatable restraint system of claim 14, wherein the gas reactant substance is applied at preselected areas of the interior surface of the inflatable restraint.

18. The inflatable restraint system of claim 14, wherein the gas reactant substance is applied in patches at preselected areas of the interior surface of the inflatable restraint.

19. The inflatable restraint system of claim 14, wherein the module housing is mounted for deployment for the inflatable restraint along an interior side surface of the vehicle.

* * * * *